United States Patent
Jiang et al.

(10) Patent No.: US 10,544,246 B2
(45) Date of Patent: Jan. 28, 2020

(54) METHODS FOR SUPPLYING SOLID CATALYSTS TO A SOLUTION POLYMERIZATION REACTOR

(71) Applicant: ExxonMobil Chemical Patents Inc., Baytown, TX (US)

(72) Inventors: Peijun Jiang, League City, TX (US); Robert T. Li, Houston, TX (US); Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 49 days.

(21) Appl. No.: 15/645,334

(22) Filed: Jul. 10, 2017

(65) Prior Publication Data

US 2018/0044453 A1    Feb. 15, 2018

Related U.S. Application Data

(60) Provisional application No. 62/373,120, filed on Aug. 10, 2016.

(51) Int. Cl.

| | |
|---|---|
| *C08F 210/16* | (2006.01) |
| *C08F 210/06* | (2006.01) |
| *B01J 8/20* | (2006.01) |
| *B01J 19/06* | (2006.01) |
| *B01J 8/08* | (2006.01) |

(52) U.S. Cl.
CPC ............. *C08F 210/16* (2013.01); *B01J 8/085* (2013.01); *B01J 8/20* (2013.01); *B01J 19/06* (2013.01); *C08F 210/06* (2013.01); *B01J 2208/00752* (2013.01)

(58) Field of Classification Search
None
See application file for complete search history.

(56) References Cited

U.S. PATENT DOCUMENTS

| | | |
|---|---|---|
| 3,012,024 A | 12/1961 | Sheldon |
| 3,790,036 A | 2/1974 | Miller |
| 3,876,602 A | 4/1975 | Calvert et al. |
| 4,610,574 A | 9/1986 | Peters |
| 4,774,299 A | 9/1988 | Dumain et al. |
| 5,312,938 A | 5/1994 | Hefner et al. |
| 5,385,992 A | 1/1995 | Koskinen et al. |

(Continued)

FOREIGN PATENT DOCUMENTS

| | | |
|---|---|---|
| EP | 2192133 | 6/2010 |
| WO | 2004/005354 | 1/2004 |
| WO | 2007/029986 | 3/2007 |

OTHER PUBLICATIONS

ISOPAR E Fluid Product Safety Summary. (Year: 2018).*

*Primary Examiner* — Catherine S Branch

(57) ABSTRACT

Disclosed is a solution polymerization process, or, alternatively, a method of delivering powder catalysts to a solution polymerization reactor, comprising combining a homogeneous single-site catalyst precursor with α-olefin monomers to form a polyolefin, wherein the homogeneous single-site catalyst precursor is in the form of (i) a dry powder, (ii) suspended in a aliphatic hydrocarbon solvent, or (iii) suspended in an oil or wax, wherein the homogeneous single-site catalyst precursor is at a concentration greater than 0.8 mmole/liter when suspended in the aliphatic hydrocarbon solvent prior to entering the solution polymerization reactor.

4 Claims, 5 Drawing Sheets

(56) References Cited

U.S. PATENT DOCUMENTS

| | | |
|---|---|---|
| 5,714,424 A | 2/1998 | Glemza et al. |
| 5,955,554 A | 9/1999 | Sivaram et al. |
| 7,494,626 B2 * | 2/2009 | Smith .................... B01J 8/0035 422/131 |
| 8,362,160 B2 | 1/2013 | Bouquoyoue et al. |
| 9,340,628 B2 | 5/2016 | Tohi et al. |
| 2002/0034464 A1 | 3/2002 | Glenn et al. |

* cited by examiner

METHODS FOR SUPPLYING SOLID CATALYSTS TO A SOLUTION POLYMERIZATION REACTOR

PRIORITY CLAIM

This application claims priority to and benefit of U.S. Ser. No. 62/373,120, filed Aug. 10, 2016 and is incorporated by reference in its entirety.

FIELD OF THE INVENTION

The present disclosure relates to methods of passing dry or suspended catalysts to reactors in homogeneous solution polymerization processes without using aromatic solvents. The disclosure also relates to methods of delivering a catalyst suspension to a homogeneous solution polymerization reactor without using aromatic carrying medium.

BACKGROUND OF THE INVENTION

Supplying catalyst to a polymerization reactor and achieving high catalyst efficiency while minimizing undesired consequences has been a challenge for many commercial processes. The problems encountered depend upon the form of the catalyst (i.e., solid, size of particles, liquid, type of solvent, etc.) and the polymerization process being used. The problems encountered can arise from catalyst degradation, poor control of catalyst feed rate, plugging of feed lines, poor mixing of the catalyst with monomers and other polymerization media, introduction of undesired quantities of carrying medium to the process, poor solubility to the polymerization medium or carrying solvent, and concerns of residual solvent in products. In particular, some catalysts suffer from prolonged contact with the hydrocarbons used as carriers in the process.

Most polymerization catalysts are either supported, heterogeneous catalysts, or unsupported homogeneous catalysts (described more below). Supported, heterogeneous catalysts are used in slurry and gas phase polymerization reactors. The active ingredients of such catalysts are supported on solid, insoluble supports and thus insoluble in any solvent. Typically, such supported catalysts are delivered or "passed" into a process line and/or reactor in a dry powder form or as a slurry in a solvent. Gas-phase fluidized bed polymerization reactors often employ dry catalyst delivery systems, sometimes utilizing a gas carrier. Slurry reactors often employ some type of solvent to deliver the heterogeneous catalyst.

But polymerization processes that employ solvents such as in slurry and solution polymerization present particular problems. Unlike the case for gas-phase polymerization reactors, it is undesirable to inject a gas when delivering catalyst into slurry or solution polymerization reactors as the excess gas could cause operability problem. Further, some supported heterogeneous catalysts suffer from prolonged contact with the solvent used to deliver them and result in low catalyst efficiency. Passing a purely solid, powder catalyst to a slurry or solution reactor can also present problems as the productivity of the system may be low.

Homogeneous catalysts are used in solution polymerization processes. Many olefin polymerization processes are carried out in the presence of an inert liquid organic solvent, and the polymer produced is dissolved in that inert organic solvent. In an olefin solution polymerization, catalysts are typically dissolved in a carrying medium and delivered into the polymerization reactor in a solution form. The catalyst solution is then mixed with monomers and other polymerization medium and the polymerization takes place in the liquid state. The catalyst carrying medium can be the same as the solvent used for polymerization, or different types of solvents with better solvency may be used. In some cases there is a problem of the catalyst, though homogeneous, being poorly soluble.

Aliphatic hydrocarbon solvents are typically used for solution polymerization of olefins. In contrast, an aromatic solvent is typically used as catalyst carrying medium due to poor solvency of catalysts in aliphatic hydrocarbon solvents. It is recognized that the use of aromatic solvent is advantageous since good solubility improves catalyst utilization efficiency. However, there are other concerns regarding the use of aromatic solvents such as toluene and xylene. Use of aromatic solvent can add additional requirements/cost in solvent separation from the high molecular weight polymer product and the solvent recovery and recycle back to the polymerization reactor. Prolonged exposure of catalyst to a carrying medium such as a hydrocarbon solvent might result in catalyst deactivation or cause process deficiencies.

It would be desirable to use non-aromatic solvents to deliver catalyst to a solution polymerization reaction. US 2015/0094434 disclosed the method of using aliphatic hydrocarbon solvent to dissolve metallocene catalysts. However, the catalyst concentration in the aliphatic hydrocarbon solvent is limited to a range from 0.02 to 0.6 mmol per liter of solvent due to poor solvency of the aliphatic hydrocarbon solvent of the catalysts in that disclosure. In that disclosure, it was found that a suspension of the catalyst resulted in poor polymer productivity and polymer yield.

The polymer production rate in a polymerization reactor is dependent on the catalyst feed rate. To increase production, a higher feed rate is needed. But for catalyst that is only soluble in aromatic solvents, this means adding more aromatic solvent in the reactor which is undesirable; alternatively, for catalyst only slightly soluble in aliphatic hydrocarbon solvents, larger feed pumps, higher levels of solvent, and larger feed lines are needed, adding cost to the production. If a means of delivering a high concentration of catalyst is found that would reduce the amount of solvent needed, aromatic or otherwise, smaller pumps and less solvent could be used, thus providing an economic benefit. Thus, an improved method of delivering powder catalyst to a solution polymerization process/reactor is needed.

Relevant patents and publications also include U.S. Pat. Nos. 3,012,024; 3,790,036; 3,876,602; 4,610,574; 4,774,299; 5,955,554; 5,714,424; US 2002/0034464; US 2015/0094434; EP 878 483 A1; WO 92/16747; and WO 96/021684.

SUMMARY OF THE INVENTION

Disclosed is a process comprising (or consisting essentially of, or consisting of) passing a homogeneous single-site catalyst to a solution polymerization reactor in the form of a suspension in an aliphatic hydrocarbon, oil, or wax; contacting the catalyst with one or more α-olefin monomers; and recovering a polyolefin; wherein the concentration of the homogeneous single-site catalyst is greater than 0.8 mmole/liter (or as disclosed herein) if suspended in an aliphatic hydrocarbon solvent, and greater than 0.2 mmole/liter (or as disclosed herein) if suspended in an oil or wax.

Also disclosed is a polymerization process comprising (or consisting essentially of, or consisting of) passing a homogeneous single-site catalyst into a catalyst feed line of a solution phase polymerization reactor wherein the catalyst is suspended in an aliphatic hydrocarbon solvent, or an oil or a wax; and contacting the homogeneous single-site catalyst and one or more α-olefin monomers; recovering a polyolefin; wherein the homogeneous single-site catalyst in the catalyst feed line is at a concentration greater than 0.8 mmole/liter (or as disclosed herein) when suspended in the aliphatic hydrocarbon solvent, and greater than 0.2 mmole/liter (or as disclosed herein) when suspended in the oil or wax.

Also disclosed is a polymerization process comprising (or consisting essentially of, or consisting of) providing a polymerization reactor having a catalyst feed line fluidly connected thereto, the polymerization reactor being operated as a solution reactor comprising α-olefin monomers and optionally a solvent; passing a homogeneous single-site catalyst into the catalyst feed line; delivering the homogeneous single-site catalyst to the polymerization reactor via the catalyst feed line in the form of a dry powder; allowing the homogeneous single-site catalyst to contact the α-olefin monomers to form a polyolefin in the solution polymerization reactor; and recovering a polyolefin.

DETAILED DESCRIPTION OF THE INVENTION

Figure 1:
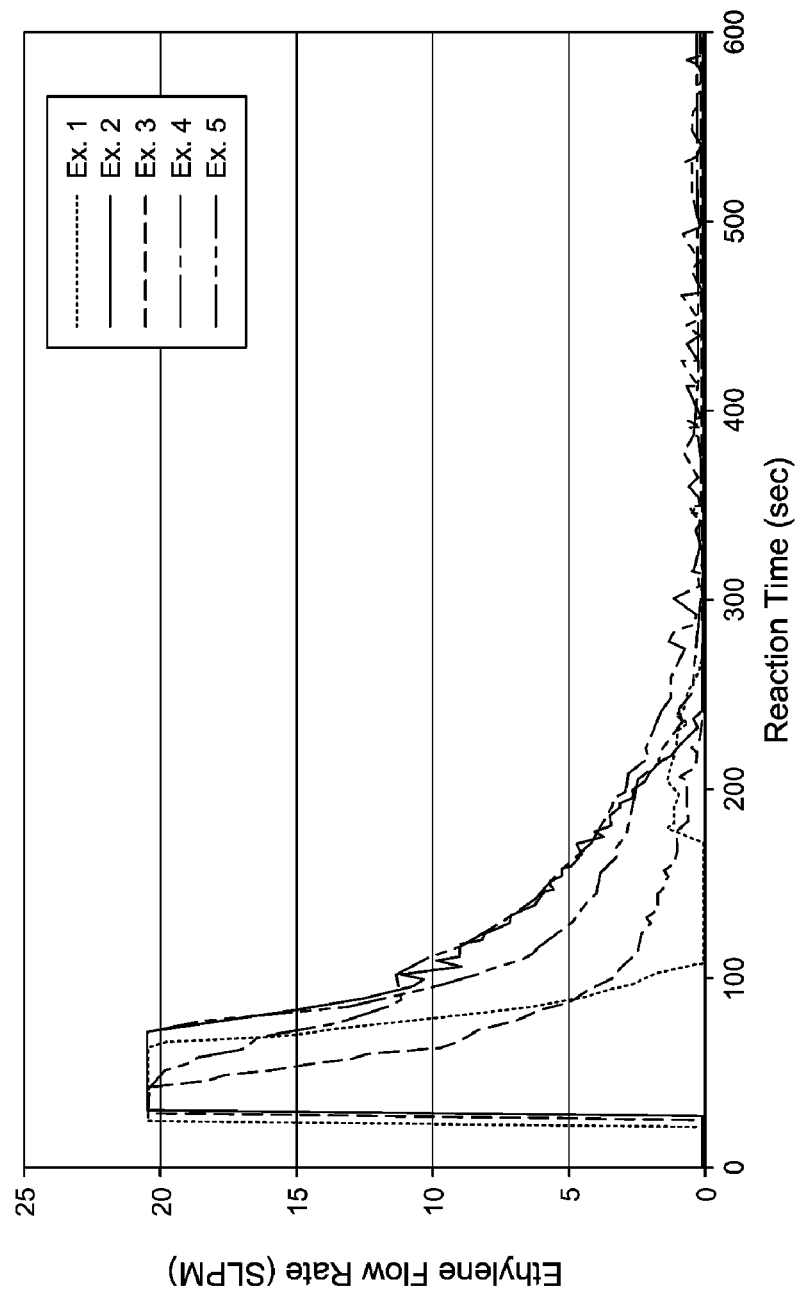
FIG. 1 shows the variations of the ethylene feed rate during polymerization reaction, showing no delay of the onset of polymerization or activity decrease when a catalyst suspension was delivered to a polymerization reactor.

A benefit of the present inventions is that aromatic solvent is not needed to obtain a high catalyst feed rate, and thus high polymer yield, since dissolving catalyst in a solvent is not necessary. In particular, it has been found that the catalyst may be delivered to a solution polymerization reactor in a suspension or slurry while still obtaining a high polymer yield.

Most single-site catalysts and activators received from the manufacturer are in finely divided solid or "powder" form. The solid catalyst and/or activator can be milled to a fine powder if not originally in such form. The inventors have found that homogeneous single-site catalysts can be delivered into a solution polymerization reactor as a slurry in an aliphatic hydrocarbon solvent, oil or wax, or in a dry powder form without sacrificing catalyst utilization efficiency. The catalysts and/or activators can be mixed with an aliphatic hydrocarbon solvent or mixture of solvents to form a suspension, mixed with high viscosity material or wax to form a thick suspension or delivered as a dry powder using a powder feeder. The catalyst is then dissolved in polymerization media inside the polymerization reactor and initiates the polymerization. The catalyst may be directly added to the polymerization reactor and subsequently contacted with an activator, or it may be first contacted with the activator and the resulting mixture subsequently added to the polymerization reactor.

As used herein, "solution polymerization process" refers to a polymerization process wherein the monomers and forming polymers are dissolved, or mostly dissolved (less than 20, or 10, or 5, or 2 wt % of the polymer suspended or not dissolved) in a diluent comprising the monomers and optionally a solvent such as an aliphatic hydrocarbon solvent as described herein, preferably a $C_4$ to $C_{14}$ aliphatic hydrocarbon solvent.

As used herein, "dry powder," refers to solid particles of catalyst and/or activator wherein solvent is absent, or if present, is present to less than 3 wt %, or 2 wt %, or 1 wt % by weight of the solvent and solid particles; preferably, the dry powder is free flowing; and also preferably, the average particle sizes are less than 20, or 15, or 10 micrometers, or within a range of 0.01, or 0.1 micrometer to 10, or 15, or 20 micrometers.

As used herein, "homogeneous catalysts" are those that are soluble in some solvent, and preferably consist of a single-site catalyst precursor (or, simply "single-site catalyst") and optionally an activator; where most preferably insoluble support materials such as silica, alumina, graphite, glass, etc. are absent.

As used herein, a "heterogeneous catalyst" is a catalyst that is in a different phase from the reactants, especially monomers, in a reaction system, typically due to the presence of an insoluble support material such as silica, alumina, graphite, glass, talc, etc. Heterogeneous olefin polymerization includes gas-phase and slurry-phase polymerization which involves a supported solid catalyst with the reactants as either liquids or gases. For olefin polymerization, heterogeneous catalyst is also referred to as "supported catalyst." For a homogeneous catalyst, the catalyst is present in the same phase as the reactants. Homogeneous catalysis applies to solution polymerization process where the catalyst is dissolved in a liquid medium and monomers are contained in a liquid phase under polymerization condition. The product polymers remain dissolved in the solvent under reactor conditions, forming a polymer solution.

As used herein, the term "polymer solution" can be any solution containing both dissolved and molten polymer, one or more solvents, one or more catalyst components, and one or more monomers or comonomers. The polymer solution may also contain dissolved inert gases or dissolved hydrogen gas and monomers such as ethylene.

As used throughout, when referring to "an aliphatic hydrocarbon solvent" or "an oil", this also includes mixtures of such compounds together and still meeting the definition of "aliphatic hydrocarbon solvent" or "oil" as described herein. Also, such compounds may be referred to herein as "solvents" in so much as they act as a carrier medium for the homogeneous single-site catalysts and/or activators.

Thus, disclosed herein in any embodiment is a process comprising (or consisting essentially of, or consisting of) passing a homogeneous single-site catalyst to a solution polymerization reactor in the form of a suspension in an aliphatic hydrocarbon, oil, or wax; contacting the catalyst with one or more α-olefin monomers; and recovering a polyolefin; wherein the concentration of the homogeneous single-site catalyst is greater than 0.8, or 0.85, or 0.9, or 0.95, or 1.0 mmole/liter if suspended in an aliphatic hydrocarbon solvent, and greater than 0.2, or 0.3, or 0.4, or 0.5 mmole/liter if suspended in an oil or wax.

Also disclosed is a polymerization process comprising (or consisting essentially of, or consisting of) passing a homogeneous single-site catalyst into a catalyst feed line of a solution phase polymerization reactor wherein the catalyst is suspended in an aliphatic hydrocarbon solvent, or an oil or a wax; and contacting the homogeneous single-site catalyst and one or more α-olefin monomers; and recovering a polyolefin; wherein the homogeneous single-site catalyst in the catalyst feed line is at a concentration greater than 0.8, or 0.85, or 0.9, or 0.95 mmole/liter when suspended in the aliphatic hydrocarbon solvent, and greater than 0.2, or 0.3, or 0.4, or 0.5 mmole/liter when suspended in the oil or wax.

In any embodiment, the concentration of catalyst is the concentration in the aliphatic hydrocarbon solvent prior to combining with monomers, or prior to entering a reactor. The concentration referred to may be the concentration, for example, in a feed stream (e.g., catalyst storage vessel, delivery vessel, and/or catalyst feed line). Most preferably, catalyst concentration is that which is passed to a polymerization reactor.

In any embodiment, the homogeneous single-site catalyst is at a concentration within a range from 0.8, or 0.85, or 0.9, or 0.95, or 1.0 mmole/liter to 1.4, or 1.6, or 1.8, or 2.0, or 2.4, or 2.6, or 3.0, or 10, or 20, or 40, or 60, or 80 mmole/liter when suspended in an aliphatic hydrocarbon solvent, prior to entering the reactor, or alternatively, in the catalyst feed line. In any case, the homogeneous single-site catalyst and/or activator will preferably be diluted once entering the reactor due to the large volume of solvent, the same or different than the solvent used to suspend/dissolve the catalyst, in the reactor.

In any embodiment, the aliphatic hydrocarbon solvent is a $C_4$ to $C_{10}$, or $C_{12}$, or $C_{14}$ aliphatic hydrocarbon solvent, more preferably $C_4$ to $C_8$, and most preferably $C_4$ to $C_6$ aliphatic hydrocarbon solvents. In any embodiment, the aliphatic hydrocarbon solvent has a viscosity at 40° C. in a range from 0.1, or 0.2, or 0.5, or 1, or 2 to 5, or 10, or 15, or 20 cSt as measured according to ASTM D445. In any embodiment, the aliphatic hydrocarbon solvent is a saturated hydrocarbon. Most preferably the aliphatic hydrocarbon solvent is selected from the group consisting of isobutane, propane, n-pentane, i-pentane, neopentane and n-hexane, isohexane, n-heptane, and combinations thereof.

In any embodiment, the oil is a $C_{15}$ or $C_{20}$ to $C_{30}$, or $C_{40}$, or $C_{50}$, or $C_{60}$, or $C_{100}$, or $C_{200}$ hydrocarbon. In any embodiment, the oil is a poly-alpha olefin, mineral oil, or combination thereof. In any embodiment, the oil has a viscosity at 40° C. in a range from 20, or 50, or 100 to 120, or 160, or 200, or 400, or 500, or 1000 cSt as measured according to ASTM D445.

In any embodiment, the homogeneous single-site catalyst is a $C_2$ symmetric bis-cyclopentadienyl metallocene, or a $C_s$ symmetric bis-cyclopentadienyl metallocene as described further herein.

In any embodiment, the homogeneous single-site catalyst and α-olefin monomers are combined at a temperature greater than 50, or 60, or 70° C., or within a range from 50, or 60, or 70, or 80, or 90, or 100, or 120° C. to 130, or 140, or 150, or 160, or 170° C. In any embodiment, a polyolefin is recovered from the reactor and/or process that is free of aromatic hydrocarbons, meaning those hydrocarbons that include, for example, benzene, xylene, toluene, naphthalene, and other aromatic compounds known in the art, and/or any compounds containing an aromatic moiety such as a benzene, benzylic group, phenylic group, naphthenic group, etc., are absent from the polyolefin, or if present, are present to less than 100, or 10, or 1 ppm relative to the polymer.

Also, in any embodiment, the aliphatic hydrocarbon solvent, oil or wax is free of aromatic hydrocarbons, meaning those hydrocarbons such as, for example, benzene, xylene, toluene, naphthalene, and other aromatic compounds known in the art, and/or any compounds containing an aromatic moiety such as a benzene, benzylic group, phenylic group, naphthenic group, etc., are absent from the solvent, or if present, are present to less than 100, or 10, or 1 ppm relative to the solvent.

In any embodiment, a homogeneous single-site catalyst is used in the process described herein. Metallocene catalysts, and non-metallocene catalysts such as so called "salen" catalysts, pyridyl diamide catalysts, and other homogeneous single-site catalysts are the preferred catalysts for the process described herein. The term "non-metallocene catalyst," also known as "post-metallocene catalyst," describes transition metal complexes that do not feature any pi-coordinated cyclopentadienyl anion donors (or the like) and are useful to the polymerization of olefins when combined with common activators. The term "catalyst" and "catalyst precursor" are used interchangeably herein unless otherwise noted.

The "metallocene" catalysts are Group 3 to 6 organometallic compounds having ligands consisting of one to two cyclopentadienyl radicals and/or radicals that are isolobal to cyclopentadienyl. "Isolobal" means radical molecules wherein the number, symmetry properties, approximate energy and shape of the frontier orbitals that participate in bonding to the Group 4 metal center, and the number of electrons in them, are similar or identical; preferably, "isolobal" ligands are those with a similar electronic bonding structure (ligand to metal) as C5-cyclopentadienyl anions. Non-limiting examples of ligands isolobal to the cyclopentadienyl group are cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl), substituted versions thereof, and heterocyclic versions thereof. "Substituted" versions thereof include those having alkyl and/or aryls bound to one or more positions along the rings, and "heterocyclic" versions thereof include rings having one or more carbons substituted by a heteroatom, preferably sulfur, nitrogen, oxygen, silicon and/or phosphorous.

A "salan" catalyst is a Group 3 to 6 organometallic compound having ligands consisting of two phenols and two Schiff bases (aryl-imine groups), where the nitrogens are preferably bridged to one another through a divalent hydrocarbyl group, and most preferably where additionally the phenol groups and aryl-imine groups are bridged together as one ligand with four coordination sites to the metal.

Most preferably, the homogeneous single-site catalyst is a $C_2$ symmetric bis-cyclopentadienyl metallocene, or a $C_s$ symmetric bis-cyclopentadienyl metallocene, preferably having any combination of two of the following: cyclopentadienyl, indenyl, fluorenyl, and substituted versions thereof. In any embodiment, at least one of the two cyclopentadienyl ligands of the homogeneous single-site catalyst is mono- or di-substituted with groups selected from $C_1$ to $C_{12}$ alkyls, $C_3$ to $C_{16}$ isoalkyl (sec- and tert-), $C_6$ to $C_{24}$ aryls, $C_9$ to $C_{24}$ fused multi-ring aryls (e.g., naphthyl, fluorenyl), $C_5$ to $C_{20}$ nitrogen and/or sulfur heterocycles (e.g., N-carbazyl), and combinations thereof. Most preferably, at least one of the two ligands is mono- or di-substituted with groups selected from iso-propyl, iso-butyl, tert-butyl, phenyl, alkylphenyl, and dialkylphenyl.

In any embodiment, the homogeneous single-site catalyst is selected from $C_s$-symmetric ansa-metallocenes. Preferably, the bridging group comprises at least one phenyl group, alkyl substituted phenyl group, or silyl substituted phenyl group. Even more preferably, the homogeneous single-site catalyst is selected from the following structures (I):

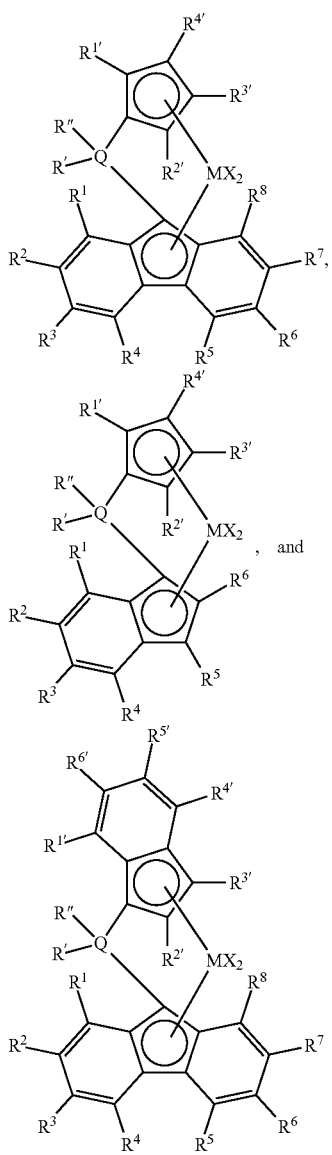

wherein M is a Group 4 metal, preferably zirconium or hafnium, most preferably hafnium; Q is silicon or carbon; R' and R" are selected from phenyl, alkyl substituted phenyl, and silyl substituted phenyl, most preferably $C_1$ to $C_5$ alkylsilyl-p-phenyl; each X is independently selected from $C_1$ to $C_{10}$ alkyls, phenyls, and halogens, most preferably $C_1$ to $C_{10}$ alkyls; each of $R^1$ to $R^8$ is independently selected from hydrogen, $C_1$ to $C_{10}$ alkyls, phenyls, and alkylphenyls; most preferably $R^1$, $R^3$ to $R^6$, and $R^8$ are hydrogen and the $R^2$ and $R^7$ groups are selected from iso-propyl, iso-butyl, tert-butyl, phenyl, alkylphenyl, and dialkylphenyl; and each of $R^{1'}$ to $R^{6'}$ is independently selected from hydrogen, $C_1$ to $C_{10}$ alkyls, and phenyls.

In any embodiment, the homogeneous single-site catalyst is most preferably selected from the following structure (II):

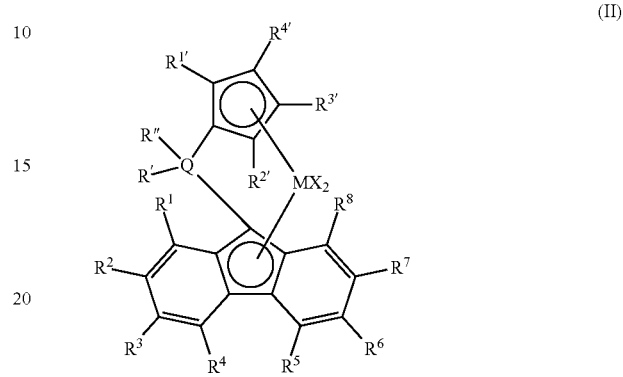

wherein M is a Group 4 metal, preferably zirconium or hafnium, most preferably hafnium; Q is silicon or carbon; R' and R" are selected from phenyl, alkyl substituted phenyl, and silyl substituted phenyl, most preferably $C_1$ to $C_5$ alkylsilyl-p-phenyl; each X is independently selected from $C_1$ to $C_{10}$ alkyls, phenyls, and halogens, most preferably $C_1$ to $C_{10}$ alkyls; each of $R^1$ to $R^8$ is independently selected from hydrogen, $C_1$ to $C_{10}$ alkyls, phenyls, and alkylphenyls; most preferably $R^1$, $R^3$ to $R^6$, and $R^8$ are hydrogen and the $R^2$ and $R^7$ groups are selected from iso-propyl, iso-butyl, tert-butyl, phenyl, alkylphenyl, and dialkylphenyl; and each of $R^{1'}$ to $R^{6'}$ is independently selected from hydrogen, $C_1$ to $C_{10}$ alkyls, and phenyls.

In any embodiment, the pyridyl diamide catalyst has the following structural formula (III):

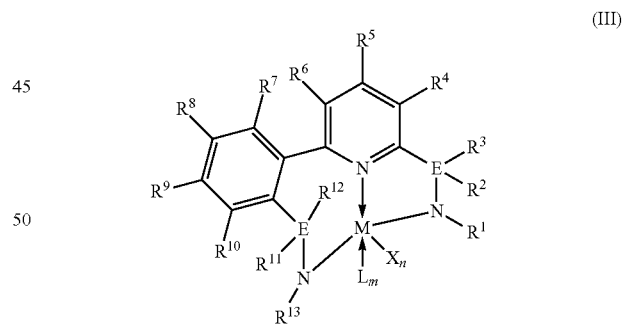

wherein M is a Group 3 to 12 metal, preferably a group 4 metal; E is selected from carbon, silicon, or germanium; X is an anionic leaving group, such as, but not limited to alkyl, aryl, hydride, alkylsilane, fluoride, chloride, bromide, iodide, triflate, carboxylate, alkylsulfonate, amide, alkoxide, and hydroxide, most preferably $C_1$ to $C_{10}$ alkyls; L is a neutral Lewis base, such as, but not limited to ether, amine, thioether; $R^1$ and $R^{13}$ are independently selected from the group consisting of hydrocarbyls, substituted hydrocarbyls, and silyl groups; $R^2$ through $R^{12}$ are independently selected from the group consisting of hydrogen, hydrocarbyls, alkoxy, silyl, amino, aryloxy, substituted hydrocarbyls, halogen, and phosphino; n is 1 or 2 or 3; m is 0, 1, or 2; and two X groups may be joined together to form a dianionic group; two L groups may be joined together to form a bidentate Lewis base; an X group may be joined to an L group to form a monoanionic bidentate group; any two adjacent R groups (e.g., $R^7$ & $R^8$, $R^{10}$ & $R^{11}$, etc.) may be joined to form a substituted or unsubstituted hydrocarbyl or heterocyclic ring, where the ring has 5, 6, 7, or 8 ring atoms and where substitutions on the ring can join to form additional rings; (preferably an aromatic ring, a six membered aromatic ring with the joined $R^7R^8$ group being —CH=CHCH=CH—); $R^{10}$ and $R^{11}$ may be joined to form a ring (preferably a five membered ring with the joined $R^{10}R^{11}$ group being —CH$_2$CH$_2$—, a six membered ring with the joined $R^{10}R^{11}$ group being —CH$_2$CH$_2$CH$_2$—).

Preferably, M in (III) is a Group 4 metal, such as zirconium or hafnium. Preferably, n is 2 and m is 0. Preferably, E is carbon. Preferred X groups include chloride, fluoride, methyl, ethyl, propyl, butyl, isobutyl, benzyl, hydrido, dialkylamido, dimethylamido, diethylamido, trimethylsilylmethyl, and neopentyl, most preferably $C_1$ to $C_{10}$ alkyl groups. Preferred $R^1$ groups include aryls, substituted aryls, 2,6-disubstituted aryls, 2,4,6-trisubstituted aryls, 2,6-diisopropylphenyl, 2,4,6-triisopropylphenyl, 2,6-diisopropyl-4-methyl-phenyl, xylyl, mesityl, and 2-ethyl-6-isopropylphenyl. Preferred $R^{13}$ groups include aryls, substituted aryls, 2-substituted aryls, cycloalkyl, cyclohexyl, cyclopentyl, 2,5-disubstituted aryl, 2-methylphenyl, 2-ethylphenyl, 2-isopropylphenyl, phenyl, and 4-methylphenyl. Preferred $R^2/R^3$ pairs include H/H, H/aryl, H/2-substituted aryl, H/alkyl, H/phenyl, H/2-methylphenyl, and H/2-isopropylphenyl.

In a preferred embodiment of (III), both $R^7$ and $R^8$ are hydrogen. Also in a preferred embodiment, $R^7$ and $R^8$ are joined together to form a six-membered aromatic ring. Also in a preferred embodiment, $R^{10}$ and $R^{11}$ are joined together to form a five or six-membered ring. Also in a preferred embodiment, $R^{11}$ and $R^{12}$ are both hydrogen. Also in a preferred embodiment, $R^1$ and $R^{13}$ may be independently selected from phenyl groups that are variously substituted with between zero to five substituents that include F, Cl, Br, I, —CF$_3$, —NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups in (III) and preferred $R^{12}$-E-$R^{11}$ groups in (III) include CH$_2$, CMe$_2$, SiMe$_2$, SiEt$_2$, SiPr$_2$, SiBu$_2$, SiPh$_2$, Si(aryl)$_2$, Si(alkyl)$_2$, CH(aryl), CH(Ph), CH(alkyl), and CH(2-isopropylphenyl), where alkyl is a $C_1$ to $C_{20}$, or $C_{40}$ alkyl group (preferably $C_1$ to $C_{10}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{20}$, or $C_{40}$ aryl group (preferably a $C_6$ to $C_{18}$ aryl group, preferably phenyl or substituted phenyl, preferably phenyl, 2-isopropylphenyl, or 2-tertbutylphenyl).

In any embodiment, the homogeneous single-site catalyst, whether a metallocene, pryidyl diamide catalyst, or other, is "alkylated," meaning that the leaving group (X in the structures I to III) is an alkyl group, and is preferably $C_1$ to $C_{10}$ alkyl group, and most preferably a methyl and/or ethyl group.

In any case, such homogeneous single-site catalysts are typically activated by suitable catalytic activator (also known as a cocatalyst) in order to perform the polymerization reaction. Suitable activators or cocatalytic materials are well known to those skilled in the art. The suitable activators include electrophilic boron activators, ionic activators, alkylaluminum, alkyl/alkoxyaluminum, alkylaluminoxane, modified alkylaluminoxane compounds and the like.

More particularly, the homogeneous single-site catalyst is desirably combined with at least one activator to effect polymerization of monomers, wherein the activator preferably comprises a non-coordinating borate anion and a bulky organic cation. In any embodiment, the non-coordinating borate anion comprises a tetra(perfluorinated $C_6$ to $C_{14}$ aryl)borate anion and substituted versions thereof; most preferably the non-coordinating borate anion comprises a tetra(pentafluorophenyl)borate anion or tetra(perfluoronaphthyl)borate anion.

Preferably, the bulky organic cation is selected from the following structures (IVa) and (IVb):

wherein each R group is independently hydrogen, a $C_6$ to $C_{14}$ aryl (e.g., phenyl, naphthyl, etc.), a $C_1$ to $C_{10}$ or $C_{20}$ alkyl, or substituted versions thereof; and more preferably at least one R group is an $C_6$ to $C_{14}$ aryl or substituted versions thereof.

In any embodiment, the bulky organic cation is a reducible Lewis Acid, especially a trityl-type cation (wherein each "R" group in (IVa) is aryl) capable of extracting a ligand from the homogeneous single-site catalyst, where each "R" group is an $C_6$ to $C_{14}$ aryl group (phenyl, naphthyl, etc.) or substituted $C_6$ to $C_{14}$ aryl, and preferably the reducible Lewis acid is triphenyl carbenium and substituted versions thereof.

In any embodiment, the bulky organic cation is a Brønsted acid capable of donating a proton to the homogeneous single-site catalyst, wherein at least one "R" group in (IVb) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The homogeneous single-site catalyst preferably reacts with the activator upon their combination to form a "catalyst" or "activated catalyst" that can then effect the polymerization of monomers. The catalyst may be formed before combining with monomers, after combining with monomers, or simultaneous therewith.

The solubility of most homogeneous single-site catalysts to most solvents used for polymerization reactor is poor. The activators are typically less soluble than the homogeneous single-site catalyst itself in aliphatic hydrocarbon solvents. Without being bound by theory, it is believed that, in homogenous catalyst system, both the catalysts and activators are desirably dissolved in the solvent in order to obtain full activation and high catalyst efficiency. Catalysts activation can take place in one of three ways. Pre-activation occurs in a carrying solvent in a container when both the catalysts and the activators are dissolved and mixed in the carrying solvent. In-line activation takes place in the feed lines when the dissolved catalysts and dissolved activators are contacted (or "combined") in the catalyst feed lines to the polymerization reactor. In-situ activation takes place in the polymerization reactors where both the catalysts and activators are passed to the polymerization reactor and dissolved. In any embodiment, a fraction of catalyst is pre-activated in the catalyst holding tank or in-line, preferably 30 wt % or less, more preferably 20 wt % or less. The majority of catalyst is first passed to the polymerization reactor undissolved or only partially dissolved ("suspended"), and then dissolved and activated in the polymerization reactor.

In any embodiment, catalyst and activator are mixed in an aliphatic hydrocarbon solvent prior to introduction into the polymerization feed and/or reactor, wherein the homogeneous single-site catalyst is at a concentration greater than 0.8, or 0.85, or 0.9, or 0.95, or 1.0 mmole/liter when suspended in the aliphatic hydrocarbon solvent prior to entering a reactor, or within a range from 0.8, or 0.85, or 0.9, or 0.95, or 1.0 mmole/liter to 1.4, or 1.6, or 1.8, or 2.0, or 2.4, or 2.6, or 3.0, or 10, or 20, or 40, or 60, or 80 mmole/liter prior to entering the reactor, or, alternatively, in the catalyst feed line. The aliphatic hydrocarbon solvent as described herein, includes aliphatic hydrocarbon solvents themselves and their mixtures, especially high viscosity hydrocarbons, and combinations thereof. The catalyst and activator can be passed into the polymerization reactor through either separated lines or mixed together and passed as a mixture in a single line. Most homogeneous single-site catalysts are partially soluble to aliphatic hydrocarbon solvent depending on the catalyst structures, concentration and process conditions such as temperature. The homogeneous single-site catalyst can be fully dissolved when the catalyst concentration is low, and is present in the suspension state when the catalyst concentration is in excess of its solubility limit. Preferably, the catalyst content in a catalyst holding tank or a catalyst delivery/storage tank is higher than its solubility limit and the undissolved catalyst is present in the suspension state. The catalyst content is preferably in a range of 0.01, or 1 wt % to 5, or 8, or 10 wt % by weight of the catalyst, any activator, and solvent in a catalyst holding tank, delivery vessel or feed line prior to entering polymerization reactor.

Activators are typically much less soluble than the homogeneous single-site catalysts in the solvents used for olefin polymerization. The solubility is improved when the catalysts are activated. A small fraction of the homogeneous single-site catalyst can be pre-activated prior to delivering to the polymerization reactor when both the catalyst and activators are mixed (or combined) in a same vessel or line since a fraction of homogeneous single-site catalyst and activator are dissolved. The fraction of pre-activation depends upon the amount of the activator dissolved in the carrying medium. Preferably the pre-activated fraction is 10 wt % or less, 5 wt % or less, even 1 wt % or less. In any embodiment, the preferred aliphatic hydrocarbon solvent useful in the present processes are aliphatic hydrocarbon solvents including $C_4$ to $C_{10}$, or $C_{12}$, or $C_{16}$ aliphatic hydrocarbon solvents, and most preferably include isobutane, propane, n-pentane, i-pentane, neopentane and n-hexane, isohexane, cyclohexane, n-heptane, with isohexane being especially preferred. Alternatively, the aliphatic hydrocarbon solvent may be the unreacted monomer itself. Additives such as dispersants and drag reducing agents can be also used to enhance the dispersion and reduce agglomeration of the catalyst powder in aliphatic hydrocarbon solvent.

In any case, the catalyst is suspended in an aliphatic hydrocarbon solvent and transferred into a catalyst feed vessel. This vessel may be agitated to maintain a uniform suspension of the catalyst. Good mixing can be also obtained by circulating the catalyst suspension through one or more circulation pumps. The suspension is then metered into the polymerization reactor by using conventional methods, such as metering pump and shot injectors as disclosed in EP 0 428 054 and EP 0 428 056. The catalyst suspension can be passed to the polymerization reactor continuously or in a periodic interval. In FIG. 2, FIG. 3, FIG. 4, and FIG. 5, various types of catalyst feeding systems are depicted, each having some type of catalyst preparation or storage tank, some mechanism for a continuous or pulse feed, forcing catalyst through one or more feed line(s), with or without "carrying medium" which may be the same or similar solvent that the catalyst is already in, or can be a gas.

Figure 2:
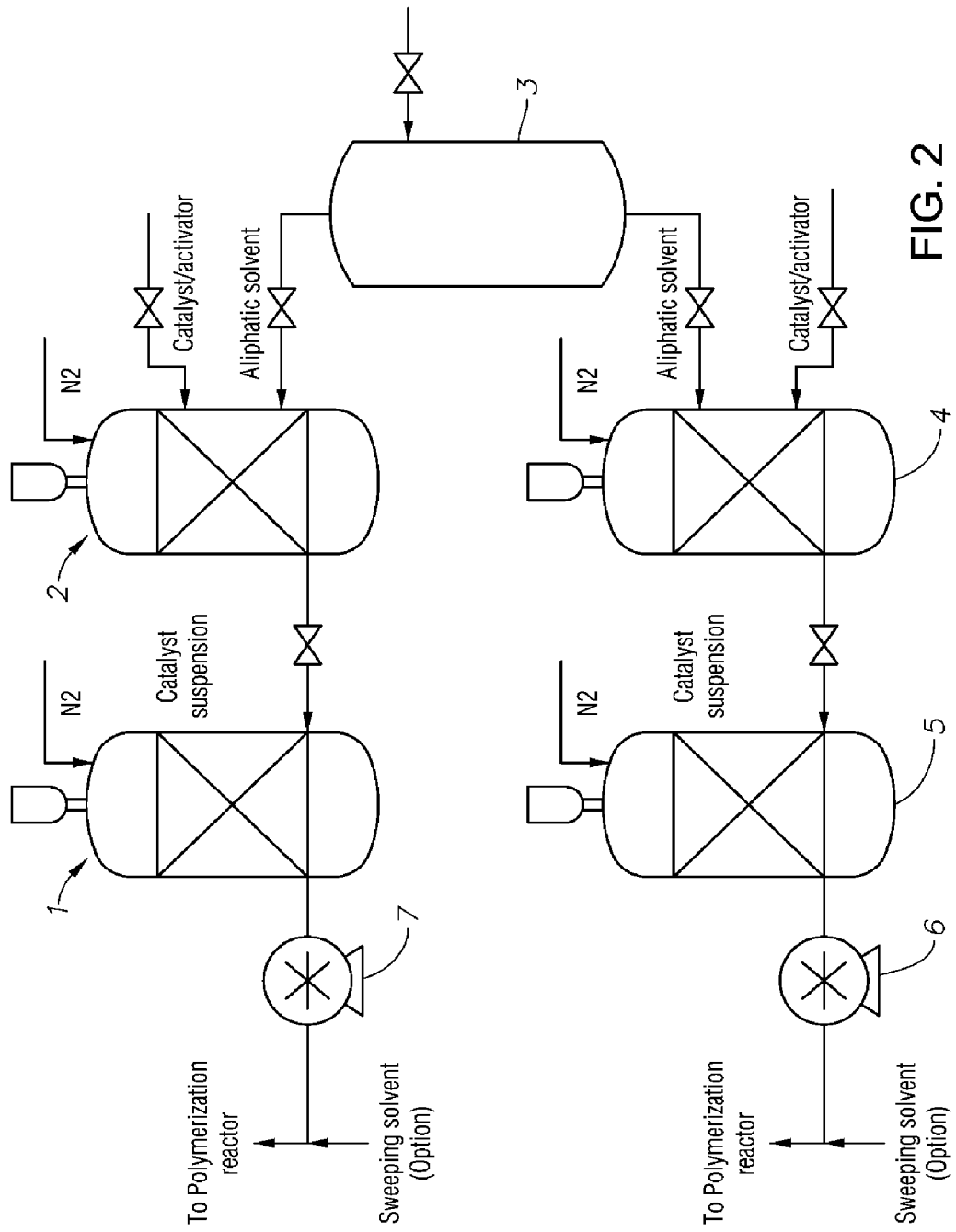
FIG. 2 illustrates a catalyst delivery system for the catalyst in an aliphatic hydrocarbon solvent suspension. The catalyst is delivered in periodic intervals according to any embodiment of the disclosure.

For example, FIG. 2 shows a schematic of a continuous catalyst feed system for the catalyst suspension according to the current disclosure. Purified aliphatic hydrocarbon solvent in solvent vessel 3 is transferred into a catalyst preparation tank 2. Homogeneous single-site catalyst and optionally activator is also charged into the catalyst preparation tank 2 in dry powder form. Nitrogen (or other inert gas) lines ($N_2$) are connected to both the aliphatic hydrocarbon solvent vessel 3 and catalyst preparation tank 2 to keep the hydrocarbon under inert atmosphere. The catalyst preparation tank 2 is equipped with an agitator to keep the suspension homogeneous. The catalyst preparation tank 2 is optionally equipped with a heating/cooling element for temperature control. The hydrocarbon can be also heated up to reduce its viscosity during the preparation process, thereby enhancing the mixing and reducing agglomeration of catalyst powder in the carrying medium. The catalyst suspension is then transferred into the catalyst delivery/storage tank 1. The catalyst suspension is continuously metered from the catalyst delivery/storage tank 1 into the polymerization reactor by using the catalyst feed pump 7. The catalyst feed pump may be any pump capable of metering the catalyst suspension in the required amount. A mass flow controller on the feed line can be also used to meter the catalyst feed rate. The catalyst suspension is optionally combined with a sweeping solvent stream after the catalyst feed pump 6 and/or 7 and then passed to the polymerization reactor though catalyst feed lines. The duplicated feed system is shown in FIG. 2 for a two-reactor polymerization system.

Figure 3:
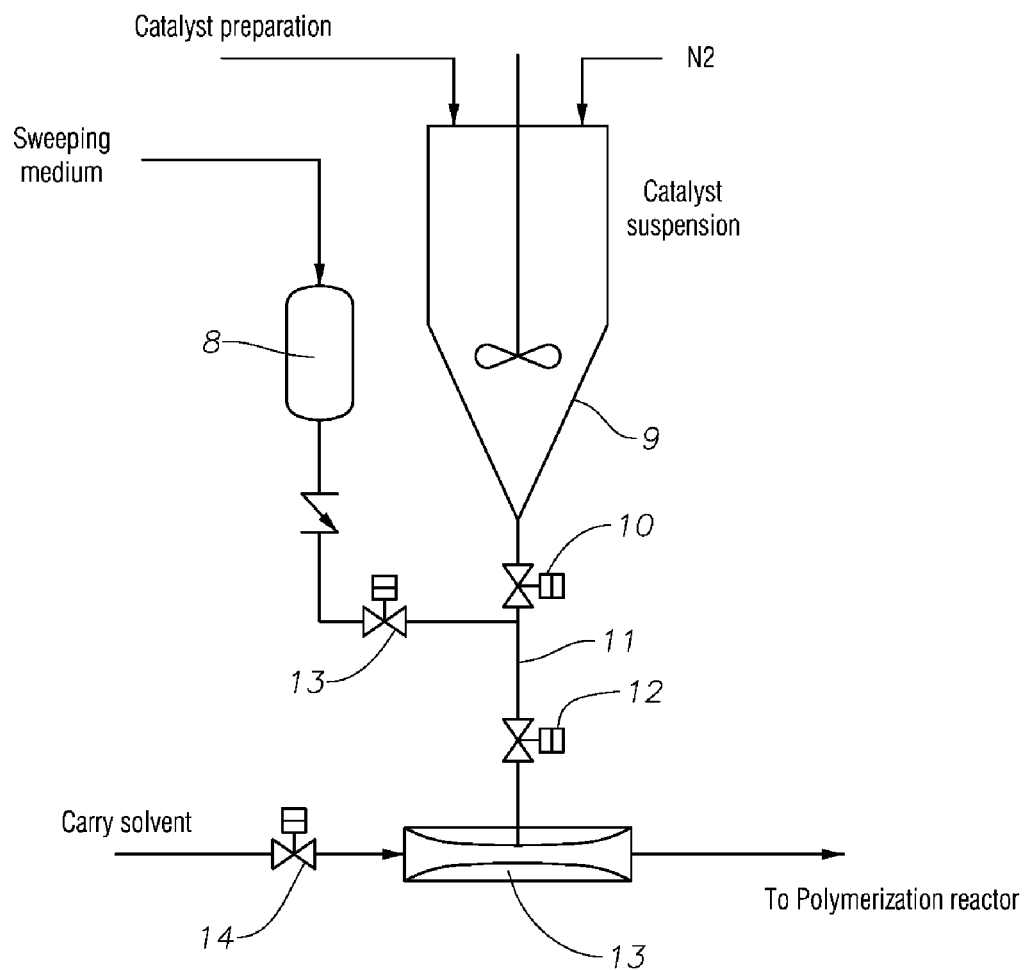
FIG. 3 illustrates a catalyst delivery system for the catalyst in an aliphatic hydrocarbon solvent suspension. The catalyst is delivered continuously according to another embodiment of the disclosure.

A method for delivery catalyst suspension in controlled quantities and in periodic intervals is illustrated in FIG. 3. The catalyst suspension is transferred from a catalyst preparation tank into the catalyst feed tank 9. An $N_2$ line is also connected to the catalyst feed tank 9 to maintain an inert atmosphere and to provide pressure required for charging the catalyst suspension into a catalyst chamber 11. The catalyst suspension in the catalyst chamber 11 is flushed into the catalyst feed stream 13 by using sweeping medium in tank 8. The catalyst feed stream 13 is then combined with a carrier solvent and transferred into the polymerization reactor. The amount of catalyst suspension passed per shot is controlled by the volume of the catalyst chamber 11. The feed rate of the catalyst suspension is controlled by the shot frequency. The shot frequency is controlled by a sequential action of valves 10, 12, 13, and 14. The operating sequence is (1) empty the catalyst chamber; (2) recharge catalyst suspension into the catalyst chamber; (3) push catalyst into the polymerization reactor. Valves 10, 12, 13, and 14 are fast opening valves and their action can be controlled by a process control system. The sweeping medium in tank 8 can be gas or liquid, preferably a liquid hydrocarbon solvent.

The sweeping medium is more preferably the same as the solvent used for polymerization. The carrier solvent can be any aliphatic hydrocarbon solvent; preferable is same as the solvent used for polymerization. The carrier solvent can also be a side stream from a recycle stream line of the polymerization reactor. In any case, the catalyst is then passed through valve 13 through a catalyst feed line to the polymerization reactor.

FIG. 2 and FIG. 3 illustrate methods for delivering catalyst suspension to a reactor for use in the polymerization of alpha-olefin comprising the steps of (1) purification of aliphatic hydrocarbon solvent; (2) preparation of catalyst suspension by mixing the catalyst powder and activator powder with aliphatic hydrocarbon solvent; (3) optional agitation to maintain catalyst powder in homogeneous suspension; and (4) feed catalyst suspension to the polymerization reactor. The method illustrated in FIG. 3 can be also used to feed catalysts in dry powder form or in viscous suspension form.

In any embodiment, the catalysts and activators can be suspended in a high viscosity aliphatic hydrocarbon solvent (or "oil") prior to introduction into the polymerization feed and/or reactor, wherein the homogeneous single-site catalyst is preferably at a concentration greater than 0.2, or 0.3, or 0.4, or 0.5 mmole/liter when suspended in the oil prior to entering a reactor, or more preferably within a range from 0.2, or 0.3, or 0.4, or 0.5 mmole/liter to 1.4, or 1.6, or 1.8, or 2.0, or 2.4, or 2.6, or 3.0, or 10, or 20, or 40, or 60, or 80 mmole/liter. The main purpose of using an oil is to avoid catalyst/activator powder or powder from settling within the mixture in the catalyst holding vessel, delivery/storage tank and feed lines. This is particularly useful for systems without agitation or long feed lines. For a given catalyst/activator, the powder settling depends on the viscosity and density of the carrying liquid. Viscosity of the carrying medium needs to be high enough so that the drag force on a powder can overcome the gravitational force. On the other hand, the viscosity is preferably low enough so the catalyst suspension is transportable to the polymerization reactors. The viscous liquid is desirably inert to the catalyst/activator. Various types of viscous liquids or greases can be used as the "oil" in the processes disclosed herein. Examples include hydrocarbon oils, such as mineral oils; synthetic oils; silicon oils; and the mixtures thereof. Synthetic poly-alpha olefin oil (PAO), such as those disclosed in US 2013/0245344, and mineral oil (including alkanes, cycloalkanes, and mixtures thereof) are particularly preferred oils. In any embodiment, aromatic hydrocarbons are absent from the oil. In any embodiment, the preferred oils are $C_6$, or $C_8$, or $C_{10}$, or $C_{12}$ to $C_{30}$, or $C_{40}$, or $C_{60}$, or $C_{80}$, or $C_{100}$, or $C_{200}$ hydrocarbons. Also in any embodiment, the preferred oils have a kinematic viscosity at 40° C. in a range of 2, or 20, or 50, or 100 to 1000, or 1400, or 1600, or 1800, or 2000 cSt as measured according to ASTM D 445.

The catalyst and activator can be suspended in a separated vessel or mixed in a single vessel. The catalyst suspension can be passed to the polymerization reactor on a continuous basis or at periodic intervals. Catalyst concentration in the suspension can be varied in a range from 0.01 to 10 wt %. Since the rate of catalyst consumption in the polymerization reactor is very low, lower catalyst concentration is preferred when the catalyst suspension is passed continuously. The catalyst concentration is preferably at least 1.0 wt %, more preferably 2.0 wt % when the catalyst is passed to the reactor at periodic intervals. Agitation is optionally provided to maintain a uniform catalyst suspension in the catalyst holding tank. The viscous liquid can be also heated up to lower its viscosity during the preparation of the catalyst suspension. All of the oils need to be purified to remove poisonous material (e.g., alcohols, ketones, and other oxygen and/or sulfur containing compounds) to the catalysts.

In any embodiment, the catalyst and activators can be in the form of a dry powder upon introduction into the feed line and/or solution polymerization reactor. The catalysts and/or activators can be milled to finer average particle sizes such as less than 20, or 15, or 10 micrometers, or within a range of 0.01, or 0.1 micrometer to 10, or 15, or 20 micrometers. This catalyst/activator powder can be passed in to the polymerization reactor using dry powder feeder, optionally followed by solvent sweeping. The catalyst and activator can be mixed together in the same vessel and passed using a single dry powder feeder. Alternatively, the catalyst and activator are kept in separated vessels and passed separately into the polymerization reactors. The catalyst and activator are then dissolved into the polymerization medium inside the polymerization reactor. No catalyst pre-activation takes place in the catalyst holding tank and feed line when both the catalyst and activator are in dry powder form. Without being bound by theory, it is believed that the catalyst and activator is preferably first dissolved, and then activated. Good mixing in the polymerization reactor is required.

Figure 4:
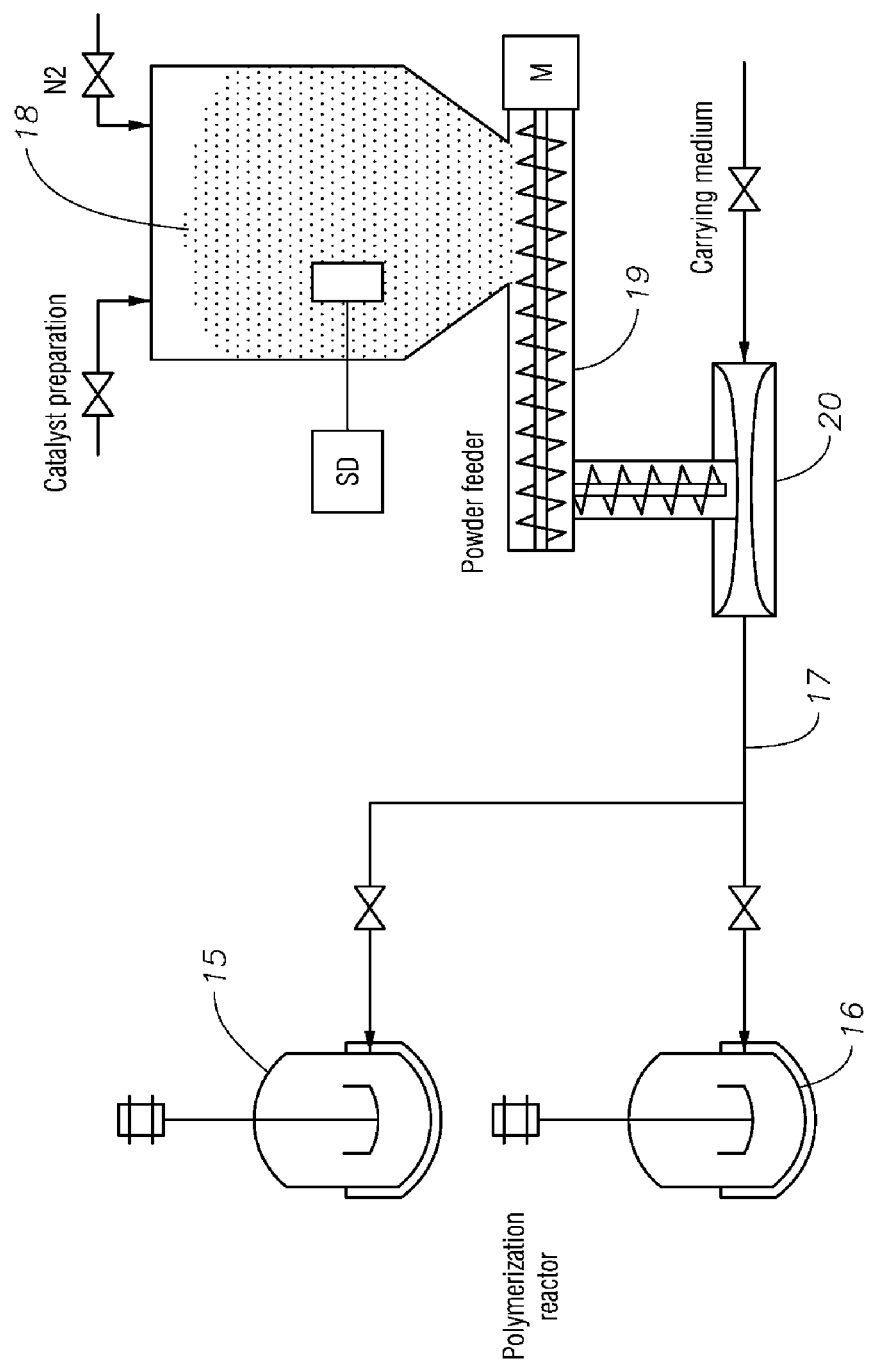
FIG. 4 illustrates a delivery system for a dry powder of catalyst according to any embodiment of the disclosure.

FIG. 4 illustrates a non-limiting example of a dry delivery apparatus. The powder of catalyst, optional activator, is transferred into the catalyst feed tank 18. The catalyst feed tank 18 is equipped with vibration mechanism or other devices to facility the powder flow. The catalyst powder is passed into the catalyst feed stream 20, and is then combined with a carry medium and transferred through line 17 into the polymerization reactor 15 and/or 16. The carry medium can be either aliphatic hydrocarbon solvent or inert gas such as $N_2$. In any case the catalyst is then passed to the catalyst feed lines leading to the polymerization reactors 15 and 16.

To feed precise amounts of catalyst without plugging of feed lines, it is preferable to keep the catalyst dry before it is passed to polymerization reactor, such as by keeping the catalyst under inert environment such as under nitrogen. A compressed carrier gas such as nitrogen or ethylene can be employed to convey the catalyst to the reactor. Any dry powder feeders can be used for delivery of catalyst/activator powder. The powder feeders are also well known to those skilled in the art. Powder feeders suitable for supplying the dry powder of catalysts are commercially available, for examples, Mechatron™ gravimetric and volumetric feeders from SchenckAccurate™, MBF Micro-Batch Feeder for continuous volumetric delivery of powder materials from Wamgroup™, Flowmotion Powder Feeder from Medicoat™, micro-discharger, circle feeder from Yoshikawa, Japan. Some of the powder feeders are not designed for polymerization and in some cases modification might be required for integrating the powder feeder into polymerization reactor systems. To facilitate the catalyst delivery, at the discharge of the powder feeder, a side stream can be taken to provide flush flows for the catalyst/activator. Preferably, the liquid used for the side steam is same as the solvent used for polymerization. Liquid monomers can be also used as sweeping liquid when catalyst and activator are passed in separated lines.

Thus, also disclosed in any embodiment is a polymerization process comprising (or consisting essentially of, or consisting of) providing a polymerization reactor having a catalyst feed line fluidly connected thereto, the polymerization reactor being operated as a solution reactor comprising α-olefin monomers and optionally a solvent; passing a homogeneous single-site catalyst into the catalyst feed line; delivering the homogeneous single-site catalyst to the polymerization reactor via the catalyst feed line in the form of a dry powder; and allowing the homogeneous single-site catalyst to contact the α-olefin monomers to form a polyolefin in the polymerization reactor.

Dry catalyst delivery systems employed in gas-phase fluidized bed polymerization reactors can also be used for this disclosure. Dry catalyst delivery systems such as in U.S. Pat. No. 3,790,036 show a compressed gas to deliver catalyst to the reactor. U.S. Pat. No. 3,876,602 discloses a system for continuous delivery of gas-entrained dry solid catalyst particles through capillary tubes. U.S. Pat. No. 4,774,299 discloses a device and process for moving dry catalyst powder from a storage chamber to a metering device and then to an intermediate chamber, through which an inert carrier gas is released by a fast-opening valve to sweep the powder to the reactor.

In any embodiment, similarly to the oil method of delivering catalysts, the catalysts and activators can be mixed with a very high viscosity oil or "wax" to form a mixture upon introduction into the polymerization feed and/or reactor. The wax medium can be inert materials such as hydrocarbon waxes, grease or other low molecular weight polymer or a mixture thereof, and are typically highly viscous or even solid at 25° C. Useful waxes have a melting point temperature greater than 40, or 60° C., and are typically $C_{28}$ to $C_{40}$, or $C_{45}$, or $C_{50}$, or $C_{60}$ hydrocarbons. Especially desirable are so called "paraffin" waxes. Preferably such carrying mediums are compatible to the polymer produced in the process and acts as a processing aid to the polymer product. The boiling temperature and molecular weight are sufficiently high so the catalyst carrying medium is contained in the polymer product after solvent removal in the product finishing process. No liquid separation and recycling are required after polymerization. To facilitate the mixing, the wax mixture can be heated up to a higher temperature and agitated, then cooled down to service temperature when a well dispersed mixture is obtained. The wax mixture can be passed to the polymerization reactor using gear pumps, piston pumps, extrusion type of pump or a syringe pump, followed by a solvent sweeping. Delivery of the catalyst powder as a wax mixture lowers the requirement on the feed line since catalyst settling is not an issue. The catalyst and activator suspensions can be passed into polymerization reactors using pumps, shot ejector feed, syringe type of pumps or extruder type of pump. A side stream can be used to flush the catalyst mixture into the reactor. Existing fluid streams to the reactor can be also used to carry the catalyst. Any suitable apparatus may be used to inject such a high viscosity oil or wax/catalyst mixture into the reactor, such as illustrated in FIG. 5.

Figure 5:
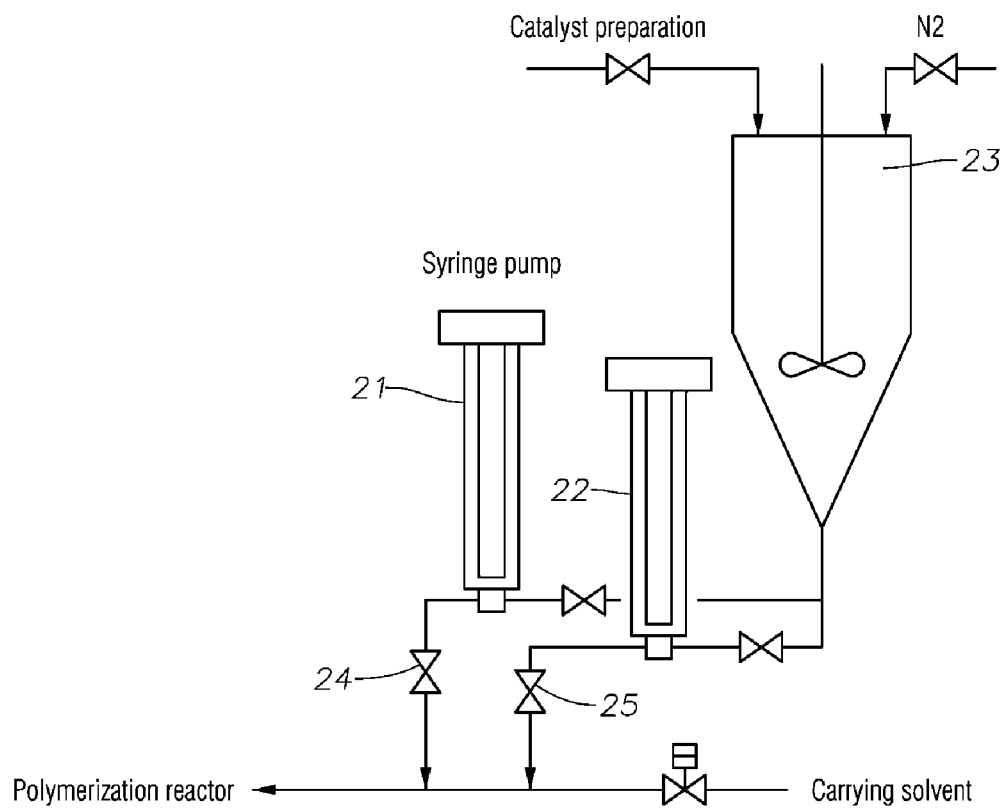
FIG. 5 illustrates a catalyst delivery system for the catalyst in a higher viscosity oil or wax according to any embodiment of the disclosure.

In particular, FIG. 5 is a non-limiting example of a high viscosity oil/wax catalyst delivery system. The prepared catalyst mixture is first transferred to the catalyst delivery/storage tank 23. The catalyst delivery/storage tank 23 is optionally equipped with an agitator to keep the mixture homogeneous. The catalyst mixture is then charged to a syringe pump 21 and/or 22. Duplicated pumps are used for continuous operation. The catalyst mixture is metered by control of the syringes and/or by control of valves 24 and 25 to deliver catalyst into a catalyst feed line to the polymerization reactor and swept into the polymerization reactor using a carrying solvent. As disclosed earlier, other type of pumps can be used in place of the syringe pumps.

Also disclosed is the use of an oil or wax suspension of homogeneous single-site catalyst to a solution polymerization process. Finally, also disclosed is the use of an aliphatic hydrocarbon solvent suspension of homogeneous single-site catalyst to a solution polymerization process.

Further disclosed in any embodiment, is the use of a dry delivery apparatus to deliver a dry powder of homogeneous single-site catalyst to a solution polymerization process. Also disclosed in any embodiment, is the use of an oil/wax delivery apparatus to deliver an oil/wax suspension of homogeneous single-site catalyst to a solution polymerization process. And also disclosed in any embodiment, is the use of a liquid delivery apparatus to deliver an aliphatic hydrocarbon solvent suspension of homogeneous single-site catalyst to a solution polymerization process.

In certain embodiments, this disclosure relates to a polymerization process comprising passing catalyst suspension having a homogeneous single-site catalyst, an activator and a solvent including aliphatic hydrocarbon solvent to form a catalyst mixture. The process may further include delivering the catalyst mixture to a polymerization reactor and contacting olefin monomers with the catalyst mixture to polymerize the olefin monomers. Such processes can be run in batch, semi-batch and continuous modes of operation. This technique can be also used as a secondary catalyst feed system for gas phase and slurry phase polymerization when multiple catalysts are employed.

In any embodiment, solution polymerization processes are carried out at temperatures that are above the cloud point of the product polymer. The "cloud point" is determined by the onset point of liquid-liquid phase separation. To maintain a polymer/solvent in a single liquid solution state, the reactor pressure and temperature needs to be relatively high. At the given temperature, lower pressure will lead to phase separation to form a polymer lean phase and a polymer dense phase. The onset point of this phase split is defined as the cloudy point. "Cloud point" is also referred as to lower critical solution temperature (LCST). Optical techniques are commonly used to determine the cloud point. These measurements are based on the light transmittance through the solution and/or turbidity of the solution in a high temperature and high pressure chamber.

In a typical solution polymerization process, catalyst components, solvent, monomers and hydrogen (when used) are passed under pressure to one or more reactors. Catalyst components may be passed in the inventive processes to the reactor as a mixture in aliphatic hydrocarbon solvent or as suspension or dry powder. The temperature of the reactor is controlled by the rate of catalyst addition (rate of polymerization), the temperature of the solvent/monomer feed stream and/or the use of heat transfer systems. For olefin polymerization, reactor temperatures can range from 50° C. to 250° C., while pressures are generally higher than 300 psig. These process conditions are in favor of in-situ catalyst activation since high temperature enhances the solubility of catalysts and activators in aliphatic hydrocarbon solvent. In one embodiment, the polymerization temperature is preferably greater than 50, or 60, or 70° C., or within a range from 50, or 60, or 70, or 80, or 90, or 100, or 120° C. to 130, or 140, or 150, or 160, or 170° C.

The monomers are dissolved/dispersed in the solvent either prior to being passed to the first reactor (or for gaseous monomers, the monomer may be passed to the reactor so that it will dissolve in the reaction mixture). Prior to mixing, the solvent and monomers are generally purified to remove potential catalyst poisons. The feedstock may be heated or cooled prior to delivery to the first reactor. Additional monomers and solvent may be added to the second reactor, and it may be heated or cooled. The catalysts/activators can be passed in the first reactor or split between two reactors. In solution polymerization, polymer produced is molten and remains dissolved in the solvent under reactor conditions, forming a polymer solution. The high efficiency of homogeneous single-site catalysts (preferably at least 20,000 kg polymer per kg of catalyst in industrial process) enables the use of very low catalyst concentration in the reactor. Thus catalyst can be fully dissolved even in a poor solvent such as aliphatic hydrocarbon solvent since the catalyst concentration required is very low. The catalyst activity is preferably 20,000 kg polymer per kg of catalyst or more, more preferably 50,000 kg polymer per kg of catalyst or more, even more preferably 100,000 kg polymer per kg of catalyst or more. Alternatively, the catalyst suspension may be premixed with the solvent in the feed stream for the polymerization reaction. Catalyst can be activated in-line. In some instances premixing is desirable to provide a reaction time for the catalyst components prior to entering the polymerization reactor.

In any embodiment, the solution polymerization processes of this disclosure include stirred reactor system comprising one or more stirred polymerization reactors. Generally the reactors should be operated under conditions to achieve a thorough mixing of the reactants. In a dual reactor system, the reactors may operate at the same or different temperatures. The residence time in each reactor will depend on the design and the capacity of the reactor. The catalysts/activators can be passed into the first reactor only or split between two reactors.

Also in any embodiment, the solution polymerization process of this disclosure uses loop type of reactor. Such reactor systems include a single reactor and multiple reactors in series or parallel configuration. The flow in these reactors is typically maintained using pumps and/or pressure systems.

In any embodiment, the solution polymerization process of this disclosure uses heat exchanger types of reactor where polymerization reaction takes place in the heat exchanger. The reactors can be one or more shell and tube type of heat exchangers, or one or more spiral type of heat exchanger. The preferred spiral types of heat exchanger polymerization process include those described in U.S. Ser. No. 62/234,518, filed Sep. 29, 2015.

In any embodiment, the polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. Phase separation occurs at the LCST. Increasing the temperature or decreasing the pressure at the LCST point leads to further phase separation. The lack of high boiling aromatic solvents allows for lower operating temperature or less vacuum pressure in the solvent removal and product finishing processes. Thus, the processes disclosed herein produces polymer products free of aromatic materials. The polymer can be also recovered from effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl) phenol, and 2,2,4-trimethyl-6-phenyl-1,2-dihydroquinoline.

Polymers that can be made in a solution polymerization process according to the current disclosure include but are not limited to homopolymers, copolymers and terpolymers of one or more of ethylene, propylene, $C_4$ to $C_{20}$ α-olefin and dienes. Particularly useful monomers include ethylene, propylene, 1-butene, 1-pentene, 1-hexene, 1-heptene, 1-octene, 1-nonene, 1-decene, 1-undecene, 1-dodecene, isomers thereof, and mixtures thereof. Desirable dienes include "non-conjugated dienes" in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes and dicyclopentadiene. Also, desirable dienes include "dual-polymerizable dienes" which are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and $C_8$-$C_{12}$ alpha-omega linear dienes (e.g., 1,7-octadiene and 1,9-decadiene); and is most preferably 5-vinyl-2-norbornene.

Non-limiting examples of desirable polymers includes polyethylene, polypropylene, ethylene-propylene copolymer (at least 50 wt % ethylene derived units by weight of the copolymer), propylene-ethylene copolymer (at least 50 wt % propylene derived units), ethylene-propylene-diene terpolymer, ethylene-butene copolymer, ethylene-hexene copolymer, ethylene-octene copolymer and mixtures thereof. Preferably, the polymer products are free of aromatic compounds or compounds containing aromatic moieties.

The various descriptive elements and numerical ranges disclosed herein for the inventive processes and apparatus elements can be combined with other descriptive elements and numerical ranges to describe the disclosure; further, for a given element, any upper numerical limit can be combined with any lower numerical limit described herein. The features of the disclosure are demonstrated in the following non-limiting examples.

EXAMPLES

Examples 1 to 5—Aliphatic Hydrocarbon Solvent

A set of ethylene and propylene copolymers were made using a catalyst suspension in a batch reactor to demonstrate the concept. The catalyst di(p-triethylsilylphenyl) methylene (cyclopentadienyl) (3,8-di-t-butylfluorenyl)hafnium dimethyl (an alkylated, homogeneous single-site catalyst) and dimethylanilinum tetrakis(heptafluoro-2-naphthyl) borate activator were mixed with 2 ml of isohexane to form a catalyst suspension. The molar ratio of activator to catalyst was 1 to 1. The polymerization was carried out in a 2-liter autoclave reactor equipped with a stirrer, an external water/steam jacket for temperature control, a regulated supply of dry nitrogen, ethylene, propylene, and a septum inlet for introduction of other solvents, catalysts and scavenger solutions. The catalyst concentration in the solvent (as a suspension) was 1.2 mmol/liter in each of examples 1, 2, 4 and 5, and 0.53 mmol/liter in example 3, prior to injection into the reactor. The reactor was first washed using hot toluene and then dried and degassed thoroughly prior to use. All the solvents and monomers were purified by passing through a basic alumina column activated at 600° C., followed by a column of molecular sieves activated at 600° C. or Selexsorb CD column prior to transferring into the reactor. In succession, 2 ml of tri-n-octylaluminum (TNOA) solution (25 wt % in hexane, Sigma Aldrich), 1000 ml of isohexane (solvent) and 400 ml of propylene were added into the reactor. The mixture was then stirred and heated to a desired temperature. Then the catalyst/activator suspension was cannulated into the reactor under nitrogen pressure. The ethylene was delivered on demand to maintain a constant reactor pressure during the polymerization reaction. The ethylene consumption was monitored during the reaction using a mass flow meter. The polymerization reaction was terminated when desired amount of polymer was produced. Thereafter, the reactor was cooled down and unreacted monomer and solvent (diluent) were vented to the atmosphere. The resulting mixture, containing mostly solvent, polymer and unreacted monomers, was collected in a collection box and first air-dried in a hood to evaporate most of the solvent, and then dried in a vacuum oven at a temperature of 90° C. for 12 hours. For comparative purpose, both the catalyst and activator were dissolved 2 ml of toluene and the catalyst was pre-activated in Example 5. The experimental conditions for all 5 examples are listed in the following Table 1. Also, the data in FIG. 1 is derived from the experiments in this section, examples 1 to 5. The examples show that the homogeneous single-site catalyst may be passed to a solution polymerization reactor in a suspension in aliphatic hydrocarbon solvent while still obtaining a high polymer yield, at least a yield of 100,000, or 110,000, or 120,000 g poly/g cat/hr.

monitored during the reaction using a mass flow meter. The detailed run conditions are summarized in Table 2. For comparative purposes, both the catalyst and activator were dissolved 2 ml of toluene and the catalyst was pre-activated in Example 11. Melt flow rate (MFR) was determined according to ASTM D1238 at 230° C. and 2.16 kg. The examples show that the homogeneous single-site catalyst may be passed to a solution polymerization reactor as a dry powder (solid) while still obtaining a high polymer yield, at least a yield of 30,000, or 35,000, or 40,000, or 50,000, or 70,000 g poly/g cat/hr.

TABLE 1

Process conditions and results for examples 1 to 5

| Process Condition | Ex. 1 | Ex. 2 | Ex. 3 (comparative) | Ex. 4 | Ex. 5 (comparative) |
| --- | --- | --- | --- | --- | --- |
| Polymerization temperature (° C.) | 80 | 50 | 50 | 30 | 80 |
| Catalyst amount (mg) | 2.2 | 2.2 | 1 | 2.2 | 2.2 |
| Isohexane (ml) | 1000 | 1000 | 1000 | 1000 | 1000 |
| Propylene (ml) | 400 | 400 | 400 | 400 | 400 |
| Ethylene (psi) | 100 | 100 | 100 | 100 | 100 |
| Reaction time (min) | 20 | 13 | 20 | 40 | 20 |
| Yield (g) | 87.1 | 68.25 | 59.3 | 32.88 | 79.6 |
| Yield (g poly/g cat /hr) | 118,773 | 143,182 | 177,900 | 22,418 | 108,545 |

Examples 6 to 11—Dry Feed

Examples 6 to 11 were produced in a 2-liter autoclave reactor following the same procedure as used for Example 1

TABLE 2

Process conditions and results for examples 6 to 11

| Process Condition | Ex. 6 | Ex. 7 | Ex. 8 | Ex. 9 | Ex. 10 | Ex. 11 (comparative) |
| --- | --- | --- | --- | --- | --- | --- |
| Polymerization temperature (° C.) | 70 | 70 | 70 | 60 | 50 | 70 |
| Catalyst amount (mg) | 2.5 | 2.4 | 2.4 | 2.4 | 2.5 | 2.5 |
| Isohexane (ml) | 600 | 600 | 600 | 600 | 600 | 600 |
| Propylene (ml) | 400 | 400 | 400 | 400 | 400 | 400 |
| Ethylene (psi) | 50 | 50 | 50 | 50 | 50 | 50 |
| Reaction time (min) | 30 | 20 | 10 | 30 | 30 | 30 |
| Yield (g) | 98 | 56.3 | 46.6 | 112.7 | 92.8 | 46.4 |
| Yield (g poly/g cat/hr) | 78,400 | 70,375 | 116,500 | 93,917 | 74,240 | 37,120 |
| MFR (g/10 min) | 15.4 | 18.3 | 16.8 | — | 3.6 | — | to 5 except that the catalyst and activator were passed to the reactor in dry powder form. The dry powder of rac-dimethyl silylbis(indenyl)hafnium dimethyl (an alkylated, homogeneous single-site catalyst) and dimethylanilinum tetrakis (heptafluoro-2-naphthyl) borate (activator) were charged into a catalyst delivery tube, then flushed into the reactor using propylene. The molar ratio of activator to catalyst was 1 to 1. In succession, 5 ml of tri-n-octylaluminum (TNOA) solution (25 wt % in hexane, Sigma Aldrich) and 600 ml of isohexane (solvent) were added into the reactor. The mixture was then stirred and heated to a desired temperature. Then the catalyst/activator powder was flushed into the reactor using 400 ml of propylene. The ethylene was delivered on demand to maintain a constant reactor pressure during the polymerization reaction. The ethylene consumption was Example 12—Mineral Oil Suspension Example 12 was produced in a 2-liter autoclave reactor following the same procedure as used for Examples 6 to 11 except that the catalyst and activator were suspended in a mineral oil. 2.4 mg of rac-dimethyl silylbis(indenyl) hafnium dimethyl and 5.8 mg of dimethylanilinium tetrakis (heptafluoronaphthyl) borate were mixed in 20 ml of white mineral oil (available from Sonneborn, Parsippany, N.J.). To ensure uniform mixing, the mixture was kept in an oven at 120° C. for 20 minutes, then hand shaken and cooled down to room temperature for polymerization. The catalyst concentration in the mineral oil was 0.24 mmol/liter prior to injection into the reactor. Polymerization was conducted at 70° C. and 2 ml of tri-n-octylaluminum (TNOA) solution (25 wt % in hexane, Sigma Aldrich) with other conditions kept the same as those listed in Table 2. The polymerization reaction lasted for 30 minutes and the yield was 106.7 grams. The examples show that the homogeneous single-site catalyst may be passed to a solution polymerization reactor as a suspension in an oil or wax while still obtaining a high polymer yield, at least a yield of 30,000, or 35,000, or 40,000, or 50,000, or 70,000 g poly/g cat/hr.

Examples 13 and 14—Dry Feed

Example 13 was produced in a 2-liter autoclave reactor following the same procedure as used for Examples 6 to 11 except that the catalyst used was a pyridyl diamide compound producing a copolymer of propylene and ethylene. The catalyst used for preparing Example 13 was previously disclosed as Complex 1 in US 2015/0141601 (paragraphs 152 to 163, the complex 8-(6-(((2,6-diisopropylphenyl)amino)methyl)pyridin-2-yl)-N-phenyl-1,2,3,4-tetrahydronaphthalen-1-amine hafnium dimethyl), and the activator was dimethylaniliniumtetrakis(pentafluorophenyl)borate. For comparative purposes, both the catalyst and activator were dissolved 2 ml of toluene and the catalyst was pre-activated in Example 14. The experimental conditions for the two examples are listed in the following Table 3. The examples show that the homogeneous single-site catalyst may be passed to a solution polymerization reactor as a dry powder (solid) while still obtaining a high polymer yield, at least a yield of 100,000, or 120,000, or 130,000, or 150,000, or 170,000 g poly/g cat/hr.

TABLE 3

Process condition and results for Examples 13 and 14

| Process Condition | Ex. 13 | Ex. 14 (comparative) |
|---|---|---|
| Polymerization temperature (° C.) | 70 | 70 |
| Catalyst amount (mg) | 1.6 | 2.2 |
| Isohexane (ml) | 600 | 600 |
| Propylene (ml) | 400 | 400 |
| Ethylene (psi) | 20 | 20 |
| Reaction time (min) | 30 | 30 |
| Yield (g) | 176.4 | 142.4 |
| Yield (g poly/g cat/hr) | 220,500 | 129,454 |

As used herein, the phrase "consisting essentially of" in a process means that no other chemical-transformation steps or processes are being carried out in the claimed process, but may otherwise include physical transformations of temperature, pressure, and amounts/concentrations of solvents and reactants.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process comprising:
   passing a homogeneous single-site catalyst to a solution polymerization reactor in the form of a dry powder;
   contacting the catalyst with one or more α-olefin monomers; and
   recovering a polyolefin.

2. The process of claim 1, wherein the homogeneous single-site catalyst is first passed to a catalyst feed line fluidly connected to the polymerization reactor.

3. The process of claim 1, wherein the homogeneous single-site catalyst and α-olefin monomers are combined at a temperature greater than 50° C.

4. The process of claim 1, wherein the polyolefin is free of aromatic hydrocarbon.

* * * * *